United States Patent
Tanaami et al.

(10) Patent No.: US 12,332,130 B2
(45) Date of Patent: Jun. 17, 2025

(54) FORCE SENSOR MODULE

(71) Applicants: SINTOKOGIO, LTD., Nagoya (JP); TOHOKU UNIVERSITY, Sendai (JP)

(72) Inventors: Yoshikane Tanaami, Nagoya (JP); Miyuki Hayashi, Nagoya (JP); Yoshiaki Kanamori, Sendai (JP); Taiyu Okatani, Sendai (JP)

(73) Assignee: SINTOKOGIO, LTD., Aichi (JP)

( * ) Notice: Subject to any disclaimer, the term of this patent is extended or adjusted under 35 U.S.C. 154(b) by 218 days.

(21) Appl. No.: 18/179,608

(22) Filed: Mar. 7, 2023

(65) Prior Publication Data
US 2023/0314247 A1    Oct. 5, 2023

(30) Foreign Application Priority Data
Mar. 31, 2022 (JP) ................... 2022-059543

(51) Int. Cl.
*G01L 1/24* (2006.01)
(52) U.S. Cl.
CPC ...................... *G01L 1/24* (2013.01)
(58) Field of Classification Search
CPC .............................................. G01L 1/24
USPC .................................................. 73/862.624
See application file for complete search history.

(56) References Cited

U.S. PATENT DOCUMENTS

| | | | |
|---|---|---|---|
| 2,752,558 A | 6/1956 | Kane | |
| 4,933,545 A * | 6/1990 | Saaski | G01L 11/02 250/231.19 |
| 5,199,303 A | 4/1993 | Benedikt et al. | |
| 5,249,468 A | 10/1993 | Benedikt et al. | |
| 5,483,994 A | 1/1996 | Maurer | |
| 5,503,023 A | 4/1996 | Benedikt et al. | |
| 5,703,282 A | 12/1997 | Kuesell et al. | |
| 6,820,487 B2 * | 11/2004 | Esashi | G01L 9/0077 73/705 |
| 8,066,681 B1 * | 11/2011 | Hall | G01L 9/0077 604/533 |

(Continued)

FOREIGN PATENT DOCUMENTS

| | | |
|---|---|---|
| CN | 1649803 A | 8/2005 |
| DE | 4103706 A1 | 1/1992 |

(Continued)

OTHER PUBLICATIONS

Translation of JP-2020094973-A (Year: 2020).*

(Continued)

*Primary Examiner* — Nathaniel T Woodward
(74) *Attorney, Agent, or Firm* — Harness, Dickey & Pierce, P.L.C.

(57) ABSTRACT

In order to reduce the chance that a metasurface pattern is damaged by electrostatic discharge, a force sensor module includes a first substrate having light transparency; a metasurface pattern provided on a first principal surface; a second substrate provided so as to face the first substrate and including a second principal surface facing the first principal surface; a reflective layer provided on the second principal surface; a spacer layer provided on the first principal surface and made of an electrically-conductive material; a joining layer for joining the second principal surface and the spacer layer together; and a grounding wire connected to the spacer layer.

4 Claims, 2 Drawing Sheets

(56) References Cited

U.S. PATENT DOCUMENTS

| | | |
|---|---|---|
| 9,201,105 B2 | 12/2015 | Iida et al. |
| 9,534,972 B2 | 1/2017 | Eichhorn et al. |
| 9,785,297 B2 | 10/2017 | Kawaguchi et al. |
| 10,886,605 B2 | 1/2021 | Varel et al. |
| 2005/0138892 A1 | 6/2005 | Misonou |
| 2014/0318273 A1* | 10/2014 | Dong ................ G01K 11/3206 374/161 |
| 2016/0349128 A1 | 12/2016 | Kaufmann et al. |
| 2019/0064532 A1* | 2/2019 | Riley, Jr. .................. G02B 6/24 |
| 2020/0158557 A1 | 5/2020 | Le Floc'H |
| 2021/0088392 A1* | 3/2021 | Kagan ....................... G01L 1/24 |

FOREIGN PATENT DOCUMENTS

| | | | |
|---|---|---|---|
| JP | 2000/294759 A | | 10/2000 |
| JP | 2004/311345 A | | 11/2004 |
| JP | 5660122 B2 | | 1/2015 |
| JP | 2020094973 A | * | 6/2020 |
| WO | 2020/014356 A1 | | 1/2020 |

OTHER PUBLICATIONS

U.S. Office Action for U.S. Appl. No. 18/179,547 mailed Apr. 7, 2025.

U.S. Office Action for U.S. Appl. No. 18/112,179 mailed Apr. 7, 2025.

\* cited by examiner

FORCE SENSOR MODULE

This Nonprovisional application claims priority under U.S.C. § 119 on Patent Application No. 2022-059543 filed in Japan on Mar. 31, 2022, the entire contents of which are hereby incorporated by reference.

TECHNICAL FIELD

The present invention relates to a force sensor module.

BACKGROUND ART

There is a known force sensor module that includes: a metasurface pattern provided on a first substrate made of glass; a reflective layer provided on a second substrate so as to face the metasurface pattern; and a spacer defining a spacing between the first substrate and the second substrate (e.g., Patent Literature 1). In such a force sensor module, light enters the metasurface pattern, and the light that passes through the metasurface pattern and that is reflected by the reflective layer is used to obtain information concerning the spacing between the metasurface pattern and the reflective layer. The spacing depends on the magnitude of force acting on the second substrate. This enables the force sensor module to detect the magnitude of the force acting on the second substrate by an optical technique.

CITATION LIST

Patent Literature

Patent Literature 1

Japanese Patent Application Publication, Tokukai, No. 2020-94973

SUMMARY OF INVENTION

Technical Problem

In the production of the force sensor module as described in Patent Literature 1, after the first substrate having the metasurface pattern provided thereon, the second substrate having the reflective layer provided thereon, and the spacer are produced separately, a step of stacking and joining together the first substrate, the spacer, and the second substrate in this order is performed.

Patent Literature 1 indicates, in FIG. 27 and paragraph [0040], that a spacer made of a photoresist resin is formed along the outer edge of the second substrate, on the surface of the reflective layer provided on the second substrate (see (1-b) in FIG. 27) and the first substrate and the second substrate are joined together with use of this spacer (see (3) in FIG. 27).

In a case of the force sensor module of such a configuration, when the first substrate, which has the metasurface pattern provided thereon and which is made of glass, becomes electrically charged for some reason, the metasurface pattern could be damaged by electrostatic discharge.

A force sensor module in accordance with an aspect of the present invention has been made in view of the above problem. An object of an aspect of the present invention is to reduce the chance that the metasurface pattern is damaged by electrostatic discharge even when the first substrate becomes electrically charged.

Solution to Problem

In order for the above problem to be solved, a force sensor module in accordance with an aspect of the present invention includes: a first substrate; a metasurface pattern; a second substrate; a reflective layer, a spacer layer; a joining layer; and a grounding wire. The first substrate has light transparency. The metasurface pattern is provided on a first principal surface of the first substrate. The second substrate is provided so as to face the first substrate, and has a second principal surface that faces the first principal surface. The reflective layer is provided on the second principal surface. The spacer layer is provided on the first principal surface and made of an electrically-conductive material. The joining layer joins the second principal surface and the spacer layer together. The grounding wire is connected to the spacer layer.

Advantageous Effects of Invention

With an aspect of the present invention, it is possible to reduce the chance that the metasurface pattern is damaged by electrostatic discharge.

DESCRIPTION OF EMBODIMENTS

Figure 1:
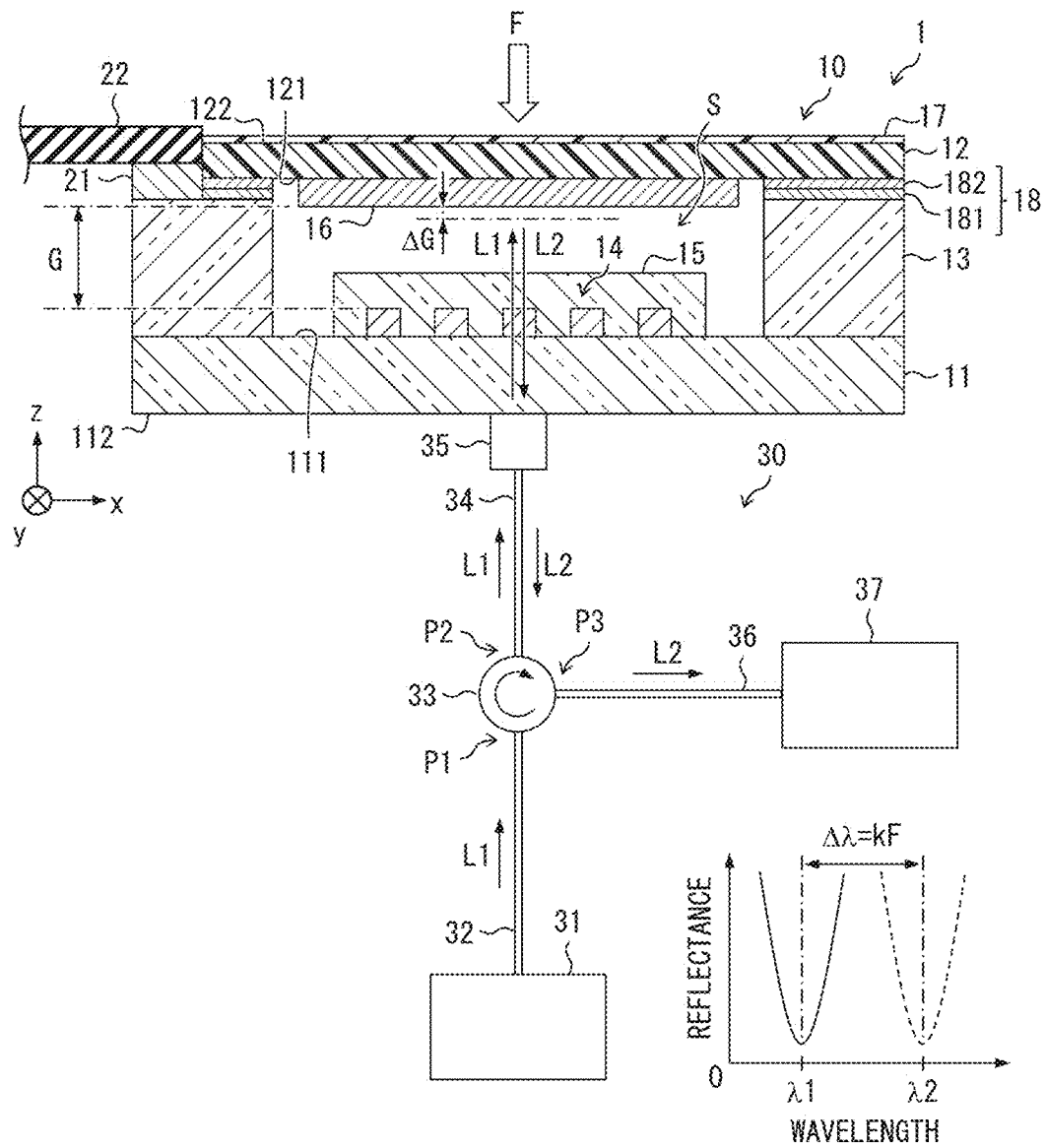
FIG. 1 is a schematic view of a force sensor system that includes a force sensor module in accordance with an embodiment of the present invention, FIG. 1 including a cross-sectional view of the force sensor module.
Figure 2:
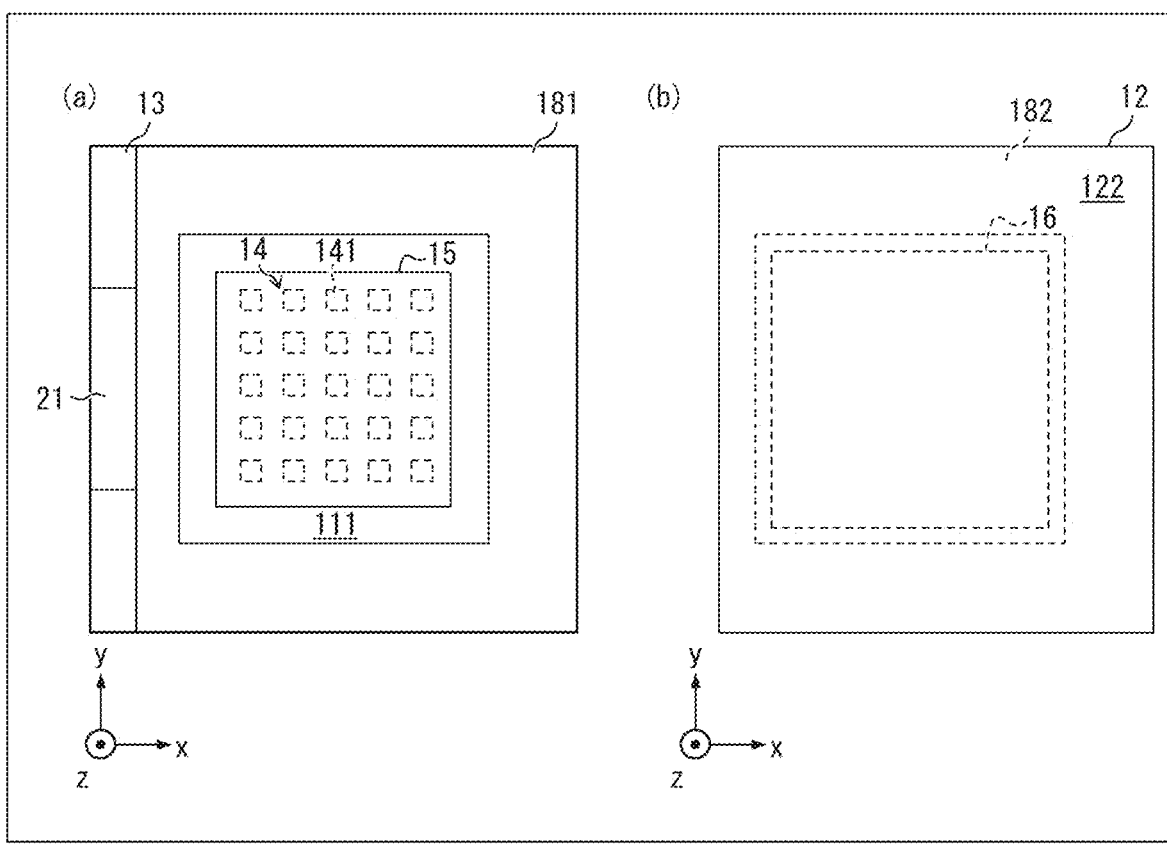
FIG. 2 is a diagram in which included are (a) that is a plan view of the first substrate of the force sensor module in FIG. 1 and (b) that is a plan view of the second substrate of the force sensor module in FIG. 1.

The following description will discuss a force sensor module 10 in accordance with an embodiment of the present invention and a force sensor system 1 including the force sensor module 10, with reference to FIG. 1. In addition, the force sensor module 10 will be described with reference to FIG. 2. FIG. 1 is a schematic view of the force sensor system 1 that includes the force sensor module 10, FIG. 1 including a cross-sectional view of the force sensor module 10. (a) of FIG. 2 is a plan view of a first substrate 11 of the force sensor module 10 and (b) of FIG. 2 is a plan view of a second substrate 12 of the force sensor module 10.

[Configuration of Force Sensor Module]

The force sensor module 10 includes: the first substrate 11; the second substrate 12; a spacer layer 13; a metasurface pattern 14; a protective layer 15; a reflective layer 16; a hard-coat layer 17; a joining layer 18; an anisotropic electrically-conductive film 21; and a grounding wire 22, as illustrated in FIG. 1.

In the force sensor module 10, a point load F is detected under the condition where, among the first substrate 11 and the second substrate 12, the second substrate 12 is subjected to the action of the point load F.

<First Substrate>

The first substrate 11 is a plate-shaped member having light transparency. In the present embodiment, non-alkaline glass is employed as a material of the first substrate 11. Non-alkali glass, which does not contain any alkali component, is resistant to surface erosion by chemicals and water, and is excellent in electrical insulation. The material of the first substrate 11 only needs to be a solid material transparent to light of the wavelength band of light L1 (which will be described later), and can be appropriately selected from among commercially available materials. Other examples of the material of the first substrate 11 include: quartz; and a polycarbonate resin. Note that in the present embodiment, the wavelength band of the light L1 is not less than 1400 nm and not more than 1600 nm, as will be described later.

In the present embodiment, the shape (see (a) of FIG. 2) of the first substrate 11 in plan view is a 4-cm square. In the present embodiment, the thickness of the first substrate 11 is 500 μm. The shape and thickness of the first substrate 11 are not limited to the above example, but can be appropriately determined. The thickness of the first substrate 11 is preferably not less than 500 μm and not more than 2000 μm.

The first substrate 11 includes a principal surface 111 and a principal surface 112 that are opposed to each other and that constitute a pair of principal surfaces. In the condition illustrated in FIG. 1, the first substrate 11 is disposed such that the principal surface 111 is located on the upper side and the principal surface 112 is located on the lower side. The principal surface 111 is an example of the first principal surface.

In the force sensor module 10, the point load F acts on the second substrate 12, as described above. In such a condition, the force sensor module 10 uses the deflection of the second substrate 12 due to the point load F, to detect the point load F. Therefore, the first substrate 11 is preferably designed such that when the second substrate 12 is subjected to the action of the point load F, the first substrate 11 does not deflect or only deflects to the extent that can be ignored when compared to the amount of deflection of the second substrate 12.

(Metasurface Pattern)

The principal surface 111 of the first substrate 11 is provided with a metasurface pattern 14, as illustrated in FIG. 1 and (a) of FIG. 2. Note that the metasurface pattern 14 is covered by the protective layer 15, and is therefore indicated by dashed lines in (a) of FIG. 2.

The metasurface pattern 14 consists of a plurality of sub patterns 141 (25 sub patterns 141 in (a) of FIG. 2) that are periodically arranged. In the present embodiment, the sub patterns 141 are arranged in a matrix with five rows and five columns. Note that (a) of FIG. 2 is a schematic view for illustrating the sub patterns 141 in an understandable manner. In actuality, the metasurface pattern 14 includes more sub patterns 141 (e.g., 10,000 sub patterns 141 for an arrangement of 100 rows and 100 columns).

In the present embodiment, each of the sub patterns 141 (i.e., the metasurface pattern 14) is made of a metal (aluminum, in the present embodiment). The metasurface pattern 14 as illustrated in (a) of FIG. 2 can be obtained by, for example, forming a continuous film of aluminum on the principal surface 111, and then using lithography technology. Aluminum is resistant to corrosion and less expensive than gold. Note that the metasurface pattern 14 is not limited to aluminum, but may be made of another metal (e.g., gold, silver, copper). Gold is easy to process and resistant to corrosion, but is expensive. In the present embodiment, the aluminum forming the sub patterns 141 is pure aluminum, which is not an alloy. Even pure aluminum, which is of high purity, contains trace amounts of impurities. The performance of the metasurface pattern 14 varies depending on the degree of purity of aluminum. This is because optical constants (refractive index, extinction coefficient) change according to the degree of purity of aluminum and the degree of purity of aluminum therefore affects the optical characteristics.

Each sub pattern 141 has the shape of a 300-nm square. Each sub pattern 141 has a thickness (i.e., the thickness of the metasurface pattern 14) of 30 nm. The thickness of each sub pattern 141 is preferably not less than nm and not more than 60 nm. The performance of the metasurface pattern 14 changes according to the thickness of each sub pattern 141. The guideline of the lower limit of the thickness of each sub pattern 141 is the skin depth. Note that the skin depth is the depth of skin determined due to the skin effect, and is the depth of a region of a metal, the region having an increased electromagnetic field density when the metal is irradiated with an electromagnetic wave of a certain frequency. When the thickness of each sub pattern 141 is closer to the skin depth, the optical characteristics become worse because, for example, light is not sufficiently reflected. On the other hand, when each sub pattern 141 is thick, generation of another resonant mode and shift of the resonance wavelength are caused, for example. Further, when each sub pattern 141 is thick, the difficulty in producing the sub pattern 141 increases.

Note that the periodic arrangement in the metasurface pattern 14, the material of the metasurface pattern 14, the shape of each sub pattern 141, the size of each sub pattern 141, and the thickness of each sub pattern 141 are not limited to those described above, but can be appropriately determined by reference to existing technology.

The force sensor module 10 includes a protective layer (which will be described later) for the purpose of reducing or preventing oxidation of the metasurface pattern 14 during cleaning. Another idea for inhibiting oxidation of the metasurface pattern 14 without using the protective layer 15 is to use, as the material of the metasurface pattern 14, a material resistant to oxidation, typified by gold and platinum.

(Protective Layer)

The principal surface 111 of the first substrate 11 is provided with the protective layer 15 completely covering each of the sub patterns 141 that constitute the metasurface pattern 14, as illustrated in (a) of FIG. 2. The protective layer is transparent to light, as is true for the first substrate 11. In the present embodiment, the protective layer 15 is a continuous film made of quartz-glass ($SiO_2$). In the present embodiment, the protective layer 15 has a thickness of 35 nm. The thickness of the protective layer 15 is not limited to this example, but can be appropriately determined. The thickness of the protective layer 15 is preferably not less than 35 nm and not more than 60 nm.

Providing the protective layer 15 makes it possible to reduce or prevent, in a step of cleaning the first substrate 11 provided with the metasurface pattern 14, oxidation of the metasurface pattern 14 (in particular, oxidation on the surface of the metasurface pattern 14) that can be caused by direct exposure of the metasurface pattern 14 to a cleaning liquid (for example, pure water). It is therefore preferable that the protective layer 15 be transparent to light and be formed by a film dense enough that the film does not transmit the cleaning liquid.

The protective layer 15 may be any layer provided that the layer is capable of reducing or preventing the aforementioned oxidation of the metasurface pattern 14. The protective layer 15 inhibits the oxidation of the metasurface pattern 14, so that it is possible to achieve, over a long period of time, desired response characteristics specified at the time of design. The material, the film-deposition method, the thickness, etc. of the protective layer 15 can be appropriately determined.

<Second Substrate>

The second substrate 12 is a plate-shaped member designed to deflect when subjected to the action of the point load F. The second substrate 12 is provided so as to face the first substrate 11, as illustrated in FIG. 1. In the present embodiment, a polycarbonate resin is employed as the material of the second substrate 12. Note that the material of the second substrate 12 only needs to be a solid material that deflects when subjected to the action of the point load F, and can be appropriately selected from among commercially available materials. Other examples of the material of the second substrate 12 include: a resin material typified by an acrylic resin, a polystyrene resin, an AS resin, and a silicone resin; and a metal material that is typified by aluminum, copper, and stainless steel.

In the present embodiment, the shape (see (b) of FIG. 2) of the second substrate 12 in plan view is a 4-cm square, as is true for the first substrate 11. In the present embodiment, the second substrate 12 has a thickness of 300 μm. The shape and thickness of the second substrate 12 are not limited to these examples, but only need to be designed such that the second substrate 12 deflects with an appropriate amount of deflection when subjected to the action of the point load F. The thickness of the second substrate 12 is preferably not less than 300 μm and not more than 400 μm.

The second substrate 12 includes a principal surface 121 and a principal surface 122 that opposed to each other and that constitute a pair of principal surfaces. The principal surface 121, which is an example of the second principal surface, faces the principal surface 111 of the first substrate 11. In the condition illustrated in FIG. 1, the second substrate 12 is disposed such that the principal surface 121 is located on the lower side and the principal surface 122 is located on the upper side.

(Reflective Layer)

The principal surface 121 of the second substrate 12 is provided with a reflective layer 16, as illustrated in FIG. 1 and (b) of FIG. 2. The reflective layer 16 is a metal film that reflects the light L1 and accordingly generates light L2 that is a reflected light of the light L1. In the present embodiment, aluminum is employed as the material of the reflective layer 16. Note that the material of the reflective layer 16 only needs to be a solid material that reflects the light L1, and can be appropriately selected from among commercially available metals. Other examples of the material of the reflective layer 16 include gold and silver. In a case where the material of the reflective layer 16 is the same as the metal of the metasurface, the process is simplified and the cost is advantageously reduced. Further, the second substrate 12 does not only need to be a metal having a high reflectance. In the force sensor module 10, the second substrate 12 and the metasurface pattern 14 are integrated with each other through the surface plasmon polariton to form an optical resonator. It is therefore considered that changing the metal of the second substrate 12 also affects the optical characteristics.

In the present embodiment, the reflective layer 16 has a thickness of 50 nm. The thickness of the reflective layer 16 is not limited to this example, but can be appropriately determined. The thickness of the reflective layer 16 is preferably not less than 50 nm and not more than 100 nm.

The material, the film-formation method, the thickness, etc. of the reflective layer 16 can be appropriately determined.

(Hard-Coat Layer)

The principal surface 122 is provided with the hard-coat layer 17, as illustrated in FIG. 1. In the present embodiment, the hard-coat layer 17 is provided so as to completely cover the principal surface 122 of the second substrate 12. The hard-coat layer 17 preferably covers as wide an area as possible of a surface of the second substrate 12, the surface being exposed to the outside of the force sensor module 10. The hard-coat layer 17 may be provided so as to further cover the lateral surface of the second substrate 12.

The hard-coat layer 17 is a covering layer designed in the same way as the covering layer provided on the surface of a smartphone, a display panel, or the like. In the present embodiment, a silicone resin is employed as the material of the hard-coat layer 17. Note that the material of the hard-coat layer 17 is not limited to this. Other examples of the material of the hard-coat layer 17 include an acrylic resin and a fluororesin.

The hard-coat layer 17 is harder than the material (a polycarbonate, in the present embodiment) of the second substrate 12, and is therefore resistant to scratching. In addition, the hard-coat layer 17 has a property of being less prone to transmit a gas.

<Spacer Layer>

The spacer layer 13 is a member provided on the principal surface 111 and made of an electrically-conductive material, as illustrated in FIG. 1. The spacer layer 13 is a member for defining the spacing (the spacing under no load) between the first substrate 11 and the second substrate 12. In the present embodiment, the spacer layer 13 is held between the first substrate 11 and the second substrate 12. The first substrate 11 and the spacer layer 13 are joined together, and the second substrate 12 and the spacer layer 13 are joiner together by the joining layer 18, which will be described later.

The spacer layer 13 is made of indium-titanium-tin. The spacer layer 13 only needs to be made of an electrically-conductive material, and the material thereof can be appropriately selected from among commercially available materials.

<Joining Layer>

The joining layer 18 is a member for joining the principal surface 121 and the spacer layer 13. In the present embodiment, the joining layer 18 is a member obtained by bonding together a first joining layer 181 provided on the first substrate 11-side and a second joining layer 182 provided on the second substrate 12-side, by a room-temperature bonding technique. The first joining layer 181 and the second joining layer 182, which constitute the joining layer 18, are made of silicon. However, the material of the first joining layer 181 and the material of the second joining layer 182 only need to exhibit favorable adhesion when deposited respectively on the spacer layer 13 and the principal surface 121 and that enable the first joining layer 181 and the second joining layer 182 to be bonded together by a room-temperature bonding technique, and can be appropriately selected from among commercially available materials. Silicon exhibits favorable adhesion with respect to both indium-titanium-tin of the spacer layer 13, and a polycarbonate resin of the second substrate 12. Further, silicon is capable of being bonded with use of a room-temperature bonding technique. Besides silicon, examples of the material of the first joining layer 181 and the second joining layer 182 include silicon oxide, copper, and titanium.

As above, the spacer layer 13 is made of indium-titanium-tin and the joining layer 18 is made of silicon, so that it is possible to join the first substrate 11 provided with the spacer layer 13 and the second substrate 12 together, with use of a room-temperature bonding technique. This makes it possible to produce the force sensor module 10 under the condition where the spacing between the principal surface 111 and the principal surface 121 is precisely controlled.

<Grounding Wire>

The grounding wire 22 is connected to the spacer layer 13. The grounding wire 22 is connected to the spacer layer 13 through the anisotropic electrically-conductive film 21, as illustrated in FIG. 1. With this configuration, it is possible to connect the grounding wire 22 to the spacer layer 13 with ease and reliability and with the grounding wire 22 having electrical conductivity.

In the present embodiment, the thickness of the spacer layer 13 and the thickness of the joining layer 18 are determined such that the spacing G between the protective layer 15 and the reflective layer 16 is 190 nm. Further, the amount of deflection of the second substrate 12 observed when the point load F acts on the center of the second substrate 12 or on the vicinity of the center of the second substrate 12 is defined as the amount of deflection ΔG. When subjected to the action of the point load F, the second substrate 12 deflects with the amount of deflection ΔG. This causes the spacing G to be narrower by the amount of deflection ΔG than the spacing G observed under no load.

As above, interposing the spacer layer 13 and the joining layer 18 between the first substrate 11 and the second substrate 12 causes the spacing between the first substrate 11 and the second substrate 12 to be fixed. Specifically, loop-shaped frames having a square outer edge and a square inner edge are employed as the spacer layer 13 and the joining layer 18. In the present embodiment, the outer edge of the spacer layer 13 and the joining layer 18 measures 4 cm per side, and has an outline that is the same in shape as the outline of the first substrate 11 and the second substrate 12. However, the shape of the outer edge of the spacer layer 13 and the joining layer 18 is not limited to this, but can be appropriately determined. Further, the spacer layer 13 and the joining layer 18 are not limited to a closed frame, but may contain an unclosed portion. Furthermore, the spacer layer 13 may be composed of a single member, or may be composed of a plurality of members. In the latter case, each of the plurality of members may be a columnar or cylindrical member serving as a column.

The spacer layer 13 has a uniform thickness. This makes it possible to fix the first substrate 11 and the second substrate 12 such that the principal surface 111 and the principal surface 121, which hold the spacer layer 13 therebetween, are parallel to each other.

Effects

Here is a description of the effects of the force sensor module 10. Patent Literature 1 discloses, in FIG. 15, a force sensor module in which a spacer made of chromium (Cr) is employed as the spacer defining the spacing between the first substrate and the second substrate. However, a spacer made of chromium cannot be joined, as it is, to the first substrate, which is made of glass.

Therefore, in a case of the force sensor module in FIG. 15, the spacer made of chromium and the first substrate are joined together with use of some joining means. In fact, polyimide tape is used as the joining means in Patent Literature 1, as described in FIG. 21 and paragraph [0035]. An approach of using polyimide tape as the joining means is useful in, for example, checking the optical characteristics of the metasurface pattern of the force sensor module which is at the prototyping stage. However, polyimide tape, which merely temporarily joins the spacer and the first substrate together, cannot be employed in a product version of the force sensor module.

As an example of the joining means for joining together the spacer made of chromium and the first substrate over a long period of time, one possible joining means is an adhesive made of a resin that is typified by an ultraviolet curing resin. However, using such an adhesive makes it difficult to precisely control the spacing between the first substrate and the second substrate.

In the force sensor module 10 in accordance with an aspect of the present invention, an intermediate film made of, for example, silicon is used for joining the spacer layer 13 and the second substrate 12. This makes it possible to precisely control the spacing between the first substrate 11 and the second substrate 12.

Further, in the force sensor module 10, grounding the grounding wire 22 causes the first substrate 11 to be grounded through the grounding wire 22 and the spacer layer 13, which is made of an electrically-conductive material. This makes it possible, in the force sensor module 10, to reduce the build-up of static electricity on the first substrate 11 and thus reduce the chance that the metasurface pattern 14 is damaged by electrostatic discharge.

Configuration of Force Sensor System

The force sensor system 1 includes the force sensor module 10 described above and a measuring section 30, as illustrated in FIG. 1. Here is a brief description of the measuring section 30.

The measuring section 30 includes: a light source 31; an optical fiber 32; a circulator 33; an optical fiber 34; a collimating lens 35; an optical fiber 36; and a light detecting section 37.

The light source 31 is configured to emit the light L1 having a wavelength band of not less than 1400 nm and not more than 1600 nm. In the present embodiment, a light-emitting diode (LED) that radiates near infrared rays is used as the light source 31. However, the light source 31 is not limited to an LED, but can be appropriately selected from among commercially available light sources. Further, the light source 31 includes a filter that is provided downstream of this LED and that limits the wavelength band of the light L1 to not less than 1400 nm and not more than 1600 nm.

The circulator 33 is an optical device that has three ports P1, P2, and P3. The circulator 33 is configured to: release, from the port P2, light that enters the port P1; release, from the port P3, light that enters the port P2; and release, from the port P1, light that enters the port P3.

The optical fiber 32 has one and the other ends that are connected respectively to the light source 31 and the port P1 of the circulator 33. Accordingly, the optical fiber 32 allows the light L1 emitted by the light source 31 to enter the port P1 of the circulator 33.

The optical fiber 34 has one and the other ends that are connected respectively to the collimating lens 35 and the port P2 of the circulator 33. Accordingly, the optical fiber 34 allows the light L1 released from the port P2 of the circulator 33 to be released to the collimating lens 35 and allows light L2 entering through the collimating lens 35 to enter the port P2.

The collimating lens 35 converts the light L1 released from one end of the optical fiber 34 into collimated light. The light L1 having been collimated by the collimating lens 35 is converted, by reflection off the reflective layer 16, into the light L2, which in turn propagates in the reverse direction of the same path. The light L2 enters the one end of the optical fiber 34 through the collimating lens 35. The collimating lens efficiently couples the light L2, which is collimated light as is true for the light L1, to the one end of the optical fiber 34.

The optical fiber 36 has one and the other ends that are connected respectively to the light detecting section 37 and the port P3 of the circulator 33. Accordingly, the optical fiber 36 allows the light L2 released from the port P3 of the circulator 33 to be released to the light detecting section 37.

The light detecting section 37 is a component for measuring the spectrum of the light L2 (reflection spectrum, in the present embodiment). In the present embodiment, the light detecting section 37 includes: a spectroscope that disperses the light L2; and a photodiode that converts, into an electrical signal, light of each of the wavelength components of the light L2 having been dispersed.

The inserted figure in FIG. 1 is a graph schematically indicating the spectrum of the light L1, which is input light of the force sensor module 10, and the spectrum of the light L2, which is output light of the force sensor module 10. In the inserted figure, the spectrum of the light L1 is indicated by a solid line, and the spectrum of the light L2 is indicated by a dashed line.

As can be seen from the inserted figure, in comparison with the central wavelength of the spectrum of the light L1, the central wavelength of the spectrum of the light L2 is shifted toward longer wavelengths by a shift amount of $\Delta\lambda$. The shift amount $\Delta\lambda$ is a quantity determined according to the spacing G illustrated in FIG. 1. The spacing G is a quantity determined according to the amount of deflection $\Delta G$ of the second substrate 12 observed when the point load F acts on the center of the second substrate 12 or on the vicinity of the center of the second substrate 12. Accordingly, the shift amount $\Delta\lambda$ of the force sensor module 10 is a quantity determined according to the magnitude of the point load F. In the force sensor system 1, it is possible to detect the point load F by obtaining or calculating the correlation between the point load F and the shift amount $\Delta\lambda$ in the force sensor module 10 in advance.

Supplementary Note

The present invention is not limited to the above embodiments, but can be altered by a skilled person in the art within the scope of the claims. The present invention also encompasses, in its technical scope, any embodiment derived by appropriately combining technical means disclosed in differing embodiments.

REFERENCE SIGNS LIST

10: force sensor module
11: First substrate
12: Second substrate
13: Spacer layer
14: Metasurface pattern
15: Protective layer
16: Reflective layer
18: Joining layer
22: Grounding wire

The invention claimed is:

1. A force sensor module comprising:
a first substrate having light transparency;
a metasurface pattern provided on a first principal surface of the first substrate;
a second substrate provided so as to face the first substrate and including a second principal surface that faces the first principal surface;
a reflective layer provided on the second principal surface;
a spacer layer provided on the first principal surface and made of an electrically-conductive material;
a joining layer for joining the second principal surface and the spacer layer together; and
a grounding wire connected to the spacer layer.

2. The force sensor module according to claim 1, wherein the spacer layer is made of indium-titanium-tin, and the joining layer is made of silicon.

3. The force sensor module according to claim 1, wherein the grounding wire is connected to the spacer layer through an anisotropic electrically-conductive film.

4. The force sensor module according to claim 1, further comprising
a protective layer that has light transparency and that covers the metasurface pattern.

* * * * *